Dec. 3, 1968     H. C. SCHNEIDER     3,414,089
DEVICE FOR PROTECTING A MECHANICAL RESONATOR AGAINST SHOCK
Filed Oct. 28, 1966                                    2 Sheets-Sheet 1

United States Patent Office 3,414,089
Patented Dec. 3, 1968

3,414,089
DEVICE FOR PROTECTING A MECHANICAL RESONATOR AGAINST SHOCK
Henri Charles Schneider, Mon Abri, Switzerland, assignor to Centre Electronique Horloger S.A., Neuchatel Switzerland, a company of Switzerland
Filed Oct. 28, 1966, Ser. No. 590,309
Claims priority, application Switzerland, Nov. 30, 1965, 16,452
10 Claims. (Cl. 188—1)

ABSTRACT OF THE DISCLOSURE

Device for protecting an oscillating mechanical resonator from shock in which is provided a resilient member positioned parallel to and co-acting with the resonator, the member having an elastically deformable extremity and another, rigidly secured extremity together with a plate member, the free extremity being vertically displaceable relative to either the plate member or to the resonator, whereby shock resulting both from an increase in the amplitude of oscillation of the resonator and from vertical movements are dampened.

---

Mechanical resonators used in watch-making as a time base or a driving member or in order to play both rolls simultaneously have an oscillation amplitude which is well determined and normally very low. It is very important that in case of shock or of violent shaking, the oscillation amplitude does not exceed a certain value. The latter is determined by: the elastic limits of the material forming the resonator, the device for transforming the rotational movement, generally consisting of a pawl cooperating with a ratchet, the pawl having to be maintained permanently on this ratchet, and by the proximity of other elements of the movement which might be damaged or at least troubled in their functioning by the resonator.

Devices for limiting the oscillation amplitude of the resonator have already been proposed. In the case of a tuning fork, they consisted in providing the oscillating masses with a stem which would come to bear against the other oscillating mass, while in the case of other forms of resonators, the latter is provided with a perforation in which engages a stud secured in the plate. However, when these devices come into operation, the shock resulting from the limitation of the course of the resonator is not diminished and the shock wave passing through the resonator produces a vibration which interferes with the frequency of oscillation.

The present invention has for object a device for protecting a mechanical resonator against shock, characterised by the fact that it comprises a first member consisting of an elastic arm secured rigidly to one of its extremities, and the relative movement of whose free extremity with respect to a second member is elastically limited in at least a part of the possible directions of oscillation of the resonator, including the directions oblique to the principal directions of oscillation, the said members being integral with the resonator while the other member is fixed with respect to the resonator.

The accompanying drawing represents, by way of example, certain embodiments of the object of the invention.

FIGURE 1 is a cross-sectional view of a first embodiment of the device according to the invention and FIGURE 2 is a plan view thereof.

FIGURES 3 and 4, FIGURES 5 and 6, and FIGURES 8 and 9 are the same as FIGURES 1 and 2, respectively, for other embodiments of the invention.

Figure 1:
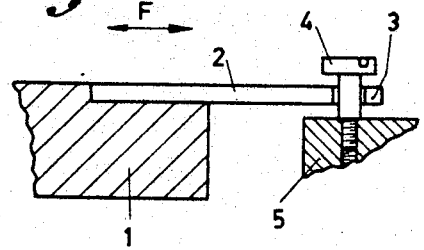
Figure 2:
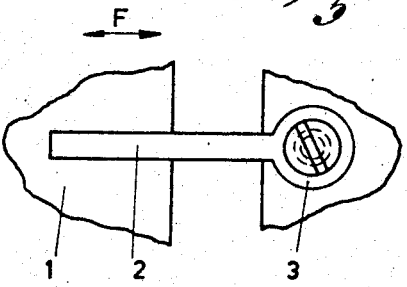

FIGURES 1 and 2 shows cross sectionally and in plan view a first embodiment in which a resilient plate 2 is encased in a resonator 1 oscillating in the direction of the double arrow F. The extremity 3 of the blade 2 has the shape of a ring surrounding the cylindrical stem of a stepped screw 4 screwed in plate 5. The ring 3, which can deform itself elastically, will soften the shocks resulting from an increase in the amplitude in the oscillation plane, while the vertical elastic limit is also ensured by the head of screw 4, plate 5, and by the bending of blade 2.

Generally, every shock can be considered as consisting of three shocks along the three principal axes of the resonator. The rigidity of the resonator along these three axes generally is different. The resiliency of the limiting system is calculated as a function of the rigidity of the resonator along its three principal axes. In a direction where the rigidity is very great, the protecting device is not necessary.

Figure 3:
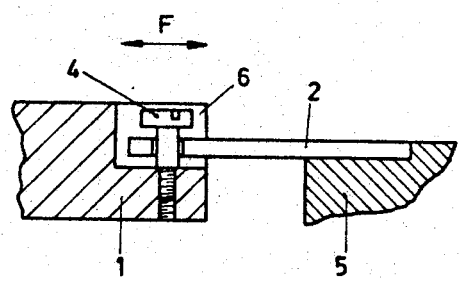
Figure 4:
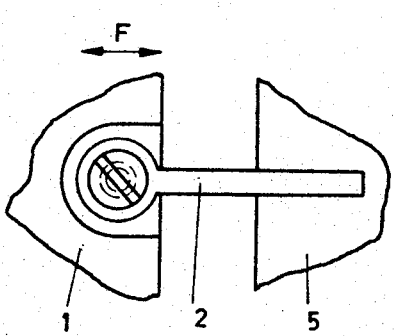

In FIGURES 3 and 4, the elements of FIGURE 1 have been used but have been inverted, that is to say blade 2 is encased in the plate while the head screw is secured in a housing 6 provided in resonator 1.

Figure 5:
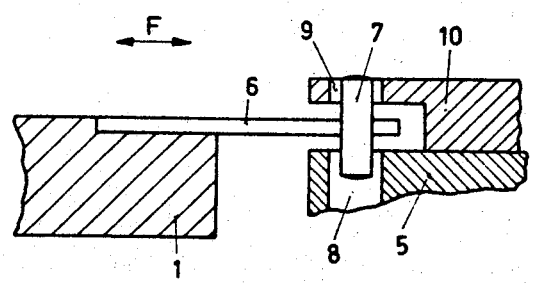
Figure 6:
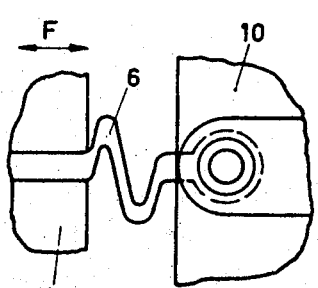
Figure 7:
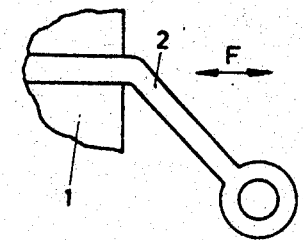
FIGURE 7 is a plan view of a particular construction of a resilient member according to the invention.

In the embodiment shown in FIGURES 5 and 6, resonator 1 bears a wimple-shaped elastic blade 6, to the end of which is secured a pin 7 engaging on the one hand a hole 8 made in plate 5 and on the other hand in a hole 9 coaxial with hole 8 made in a bridge 10. The wimples ensure the resiliency of blade 6 in the oscillation direction F, the elasticity of the blade along this axis being superior to that obtained by ring 3 of blade 2 of FIGURE 1. FIGURE 7 shows in plan view another embodiment permitting to obtain a relatively large resistance in most of the directions coplanar to the plan of oscillation merging with the plane of the figure. To this effect blade 2 forms an angle with the direction of oscillation F.

Figure 8:
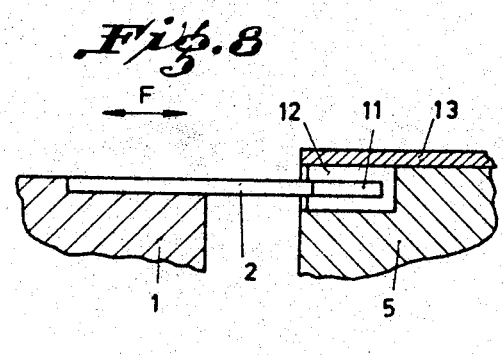
Figure 9:
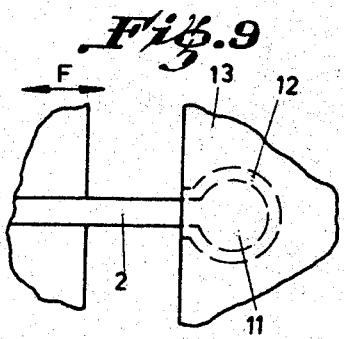

FIGURES 8 and 9 shows also cross-sectionally and in plan form another embodiment in which the free extremity of blade 2 encased in resonator 1 has the shape of a pallet 11 fitting in a circular housing 12 closed by a plate 13. As in the case of FIGURE 2, blade 2 can be encased in the plate and a lodging 12 made in the resonator. In order to take into account as well as possible the maximum deformation permissible in certain directions, there is given to the members for example, the ring, the washer or screw, the shape or section which is the most suitable.

Figure 10:
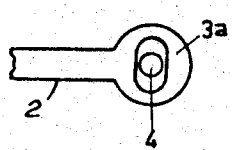
FIGURES 10–15 are fragmentary plan views of various modifications of the resilient member and of the fastening means cooperating therewith.

In FIGURE 10 the enlarged extremity 3a of resilient member 2 is provided with an elongated slot perpendicular to the direction of oscillation of the resonator and permits relative movement of the resilient member with respect to screw 4 shown in FIGURES 1 and 3.

Figure 11:
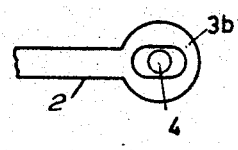

In FIGURE 11 the slot is provided in enlarged section 3b of resilient member 2 in a direction parallel to the direction of oscillation.

Figure 12:
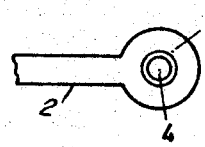

In FIGURE 12 the enlarged extremity 3c of resilient member 2 has a circular opening of a substantially greater diameter than the diameter of screw 4.

Figure 13:
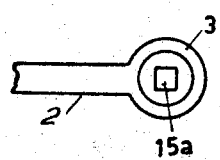

In FIGURE 13 the enlarged extremity 3 of resilient member 2 has a circular opening in which fits a square pin 15a.

Figure 14:
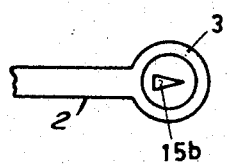
Figure 15:
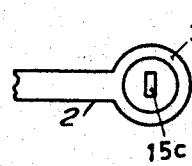

In FIGURE 14 the opening in the enlarged extremity 3 cooperates with a pin 15b of triangular cross-section while in FIGURE 15 the opening in enlarged section 3 cooperates with a pin 15c in the shape of a parallelogram.

What is claimed is:

1. Device for protecting an oscillating mechanical resonator from shock comprising a resilient member positioned parallel to and co-acting with said resonator, said member consisting of an arm having an elastically deformable free extremity and another end rigidly secured to said resonator, said free extremity being freely vertically displaceable relative to said resonator, said arm having an opening at said free extremity thereof; and a plate member having securing means for said arm freely fitting in said opening whereby shocks resulting both from an increase in the amplitude of oscillation of said resonator and from vertical movements are dampened.

2. Device for protecting an oscillating mechanical resonator from shock having a housing therein comprising a plate member, a resilient member positioned parallel to and co-acting with said resonator, said resilient member consisting of an arm having one end rigid with said plate member and terminating in an annular extremity being vertically displaceable in said housing relative to said resonator, whereby shocks resulting both from an increase in the amplitude of oscillation of said resonator and from vertical movements are dampened.

3. Device according to claim 1, wherein said resilient member consists of an arm at an angle relative to said resonator.

4. Device according to claim 1, wherein said resilient member is curved.

5. Device according to claim 1, wherein said resilient member is S-shaped.

6. Device according to claim 1, wherein the free end of said resilient member is enlarged in the shape of a pallet.

7. Device according to claim 1, wherein said free extremity of said resilient member is enlarged and has a slot therein for permitting movement of said member relative to the direction of oscillation of said resonator.

8. Device according to claim 7, wherein said slot is parallel to said direction of oscillation.

9. Device according to claim 7, wherein said slot is perpendicular to said direction of oscillation.

10. Device according to claim 1, wherein said free extremity of said resilient member is enlarged and has an opening of a diameter substantially greater than the width of said arm for permitting movement of said member relative to the direction of oscillation of said resonator.

References Cited

UNITED STATES PATENTS

| | | |
|---|---|---|
| 2,004,062 | 6/1935 | Chase. |
| 2,230,414 | 2/1941 | Piron. |
| 2,241,837 | 5/1941 | Williams et al. |
| 2,655,049 | 10/1953 | Cole. |

DUANE A. REGER, *Primary Examiner.*